(12) United States Patent
Kruempelmann (10) Patent No.: US 8,332,462 B2
(45) Date of Patent: Dec. 11, 2012

(54) CORRELATING GROUPS OF APPLICATION SYSTEMS

(75) Inventor: Wulf Kruempelmann, Altlussheim (DE)

(73) Assignee: SAP AG, Walldorf (DE)

( * ) Notice: Subject to any disclaimer, the term of this patent is extended or adjusted under 35 U.S.C. 154(b) by 449 days.

(21) Appl. No.: 12/627,689

(22) Filed: Nov. 30, 2009

(65) Prior Publication Data

US 2011/0131268 A1 Jun. 2, 2011

(51) Int. Cl.
*G06F 15/16* (2006.01)
(52) U.S. Cl. .................... 709/202; 709/201; 709/228
(58) Field of Classification Search .............. 709/201, 709/202
See application file for complete search history.

(56) References Cited

U.S. PATENT DOCUMENTS

2006/0059253 A1* 3/2006 Goodman et al. ............ 709/223

* cited by examiner

*Primary Examiner* — Wing F. Chan
*Assistant Examiner* — Andrew Woo
(74) *Attorney, Agent, or Firm* — Fish & Richardson P.C.

(57) ABSTRACT

Implementations of a computer-implemented method include instantiating a first computer program that is executable using one or more processors, using the first computer program, defining a first group comprising a plurality of application systems and a second group comprising a plurality of application systems, correlating the plurality of application systems within the first group to generate a correlation model, storing the correlation model in a computer-readable storage medium, and providing a target group comprising a plurality of application systems based on the correlation model.

21 Claims, 6 Drawing Sheets

CORRELATING GROUPS OF APPLICATION SYSTEMS

BACKGROUND

Technical application systems are often assembled into a number of groups. Each group typically provides particular objectives for the system. Exemplar objectives may include controlling software transportation or specifying the operational processes in the systems. In some systems, some groups may resemble the characteristics of one another. For example, systems that describe the same operational processes can also be in the same group as the systems that control the software deployment. Within the groups, the systems can adopt roles that are similar to roles in other groups.

If two groups share similar roles, a user may be required to enter role information in each group separately. The separate data entry may leave a margin of error for one or both systems if, for example, a user enters the data in both groups and returns to update only one group. In addition, user errors may be introduced including, but not limited to errors of omission, typographical errors, assignment errors, mismatched data errors, and so on.

SUMMARY

Implementations of the present disclosure provide a computer-implemented method including instantiating a first computer program that is executable using one or more processors, using the first computer program, defining a first group comprising a plurality of application systems and a second group comprising a plurality of application systems, correlating the plurality of application systems within the first group to generate a correlation model, storing the correlation model in a computer-readable storage medium, and providing a target group comprising a plurality of application systems based on the correlation model.

In some implementations, the method further includes storing correlations between the first group and the second group in the correlation model, wherein providing the target group is further based on the correlations between the first group and the second group.

In some implementations, the method further includes defining a first set of roles, each role of the first set corresponding to an application system of the first group, and defining a second set of roles, each role of the second set corresponding to an application system of the second group, wherein the correlation model further comprises correlations between the first set of roles and the second set of roles.

In some implementations, the method further includes receiving an input corresponding to a group type, and generating a list of available groups based the group type and at least one of the first group and the second group, wherein the target group is provided based on a user selection from the list.

In some implementations, the method further includes editing the first group, and carrying over edits of the first group to the target group.

In some implementations, the method further includes instantiating a second computer program that is executable using one or more processors, wherein the target group is provided for execution with the second computer program.

In some implementations, providing the target group comprises integrating at least a portion of system information provided in the correlation model to the target group.

In some implementations, the first group and the second group correspond to a group type, and one of the first group and second groups is used as a template to define the target group, the target group corresponding to a different group type.

Implementations of the present disclosure further provide a computer-readable storage medium coupled to one or more processors and having instructions stored thereon which, when executed by the one or more processors, cause the one or more processors to perform operations in accordance with implementations of the methods provided herein.

Implementations of the present disclosure also provide a system including one or more processors and a computer-readable storage medium coupled to the one or more processors and having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
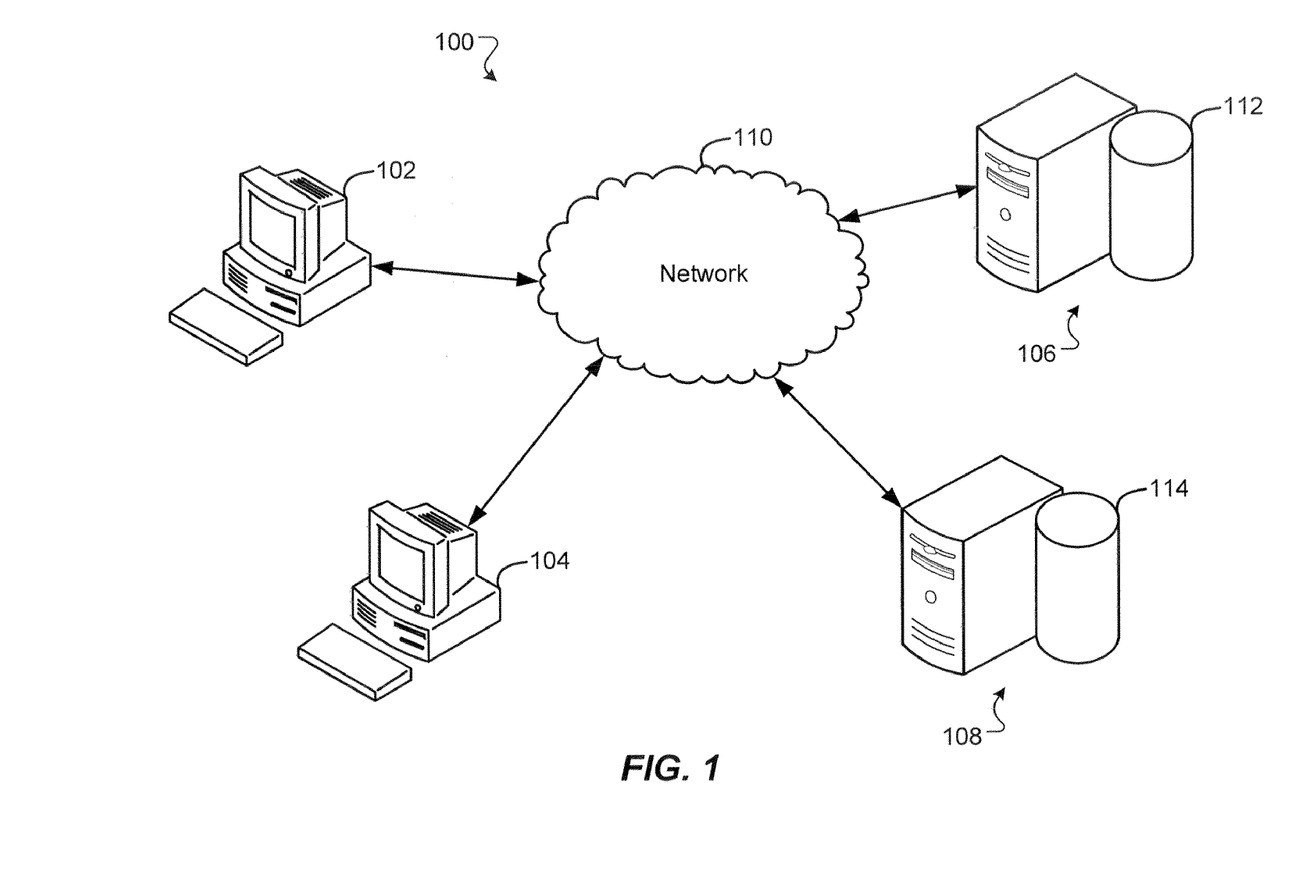
FIG. 1 is a block diagram of an exemplar system architecture that can execute implementations of the present disclosure.

FIG. 1 is a block diagram of an exemplar system architecture 100 that can execute implementations of the present disclosure. The architecture 100 may represent any client/server system that spans one or more networks. In one example, the architecture 100 represents a set of system groups that allow users to define a purpose for a group of systems. For example, a user may define a set of computer systems that are used for testing purposes. In this example, the test systems can be grouped to form a test environment within architecture 100. Similarly, the user may define a set of computer systems that are used for a development environment, a production environment, or other networked environment.

The architecture 100 can, for example, produce environments that generate correlations between different types of system groups. In particular, the architecture 100 can produce and assign correlations between system groups (e.g., landscapes) such that the groups can be accessible for reuse in other systems. For example, the architecture 100 can generate a selectable list of groups for users (based on correlation data, group type, or other input). Each group within the list can be employed as a template for creating new system groups and/or system group types for an environment or system. For example, users can select a system group and generate other system groups based on the selected system group.

A system group represents an entity that handles back-end systems (or a logical grouping of a set of systems) that require similar processes, such as mobile clients. System groups may define a number of system roles. A system role represents the use of a system-client combination in systems of a logical component. The system role typically describes the usage criteria for a particular system-client combination in a user-specific system.

Each group may include a group type (e.g., type identifier) that describes the function of the group. Some examples of group types may include a development group type, a test group type, or a production group type. Each role may include a role type that pertains to the function in a specific application system in a group. For example, a programmer role type may be assigned as a developer function for an application in a development group. Assigning a group type may provide a way to contextually link similar system groups together. Similarly, assigning system roles to groups may provide a way to contextually link similar system roles and tasks together. In some implementations, a contextual link represents similar groups, similar roles, or roles subsumed by a particular group.

The linked relationships may be used to generate a correlation model that can be accessed by system users who wish to create similar group types, roles, and relationships between the system groups and roles. Specific correlation data may be used to generate the correlation model. The user may employ the correlation model when defining a new group in an application system. The architecture 100 can, in some examples, provide selectable correlation models. The selectable correlation models are generally predefined and may be combined to define a new group in an application system.

At a high level, the architecture 100 may represent a client/server system supporting multiple computer systems including a client 102, a client 104, and/or one or more servers 106 and 108 that are connectively coupled for communication with one another over a network 110. In some implementations, the clients 102,104 may be directly connected to the servers 106 or 108 (without connecting via network 110) to monitor user interactions.

The clients 102, 104 are intended to represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 102, 104 may access application software on server devices 106 and/or service device 108.

The server systems 106, 108 are intended to represent various forms of servers including, but not limited to a web server, an application server, a proxy server, a network server, a server farm, etc. The server system 106 can, for example, be provided as an application server that executes software accessed by client computers 102, 104. The software can include systems as illustrated in FIG. 4 below (e.g., a solution manager, a transport manager, a portal, etc.). The server system 108 can, for example, be a model server for the common information model (CIM) that is used to define the correlations illustrated in FIG. 2, or for subsequent importing/replication into other programs (see FIG. 3).

In operation, multiple clients (e.g., clients 102, 104) can communicate with server 106 or server 108 via network 110. In some implementations, a user can invoke applications available from the server 106 in a web browser running on client 102, 104. Each application can individually access data from a number of repository resources. For example, the server 106 can access one or more repositories 112 and similarly, the server 108 can access one or more repositories 114.

In some implementations, the client devices 102, 104 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver (not shown). In addition, short-range communication may occur, such as using a Bluetooth, WiFi, or other such transceiver.

In some implementations, the architecture 100 can be a distributed client/server system that spans one or more networks such as network 110. The network 110 can be provided as a large computer network, such as a local area network (LAN), wide area network (WAN), the Internet, a cellular network, or a combination thereof connecting any number of mobile clients, fixed clients, and servers. In some implementations, each client (e.g., clients 102, 104) can communicate with the servers 106, 108 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

Figure 2:
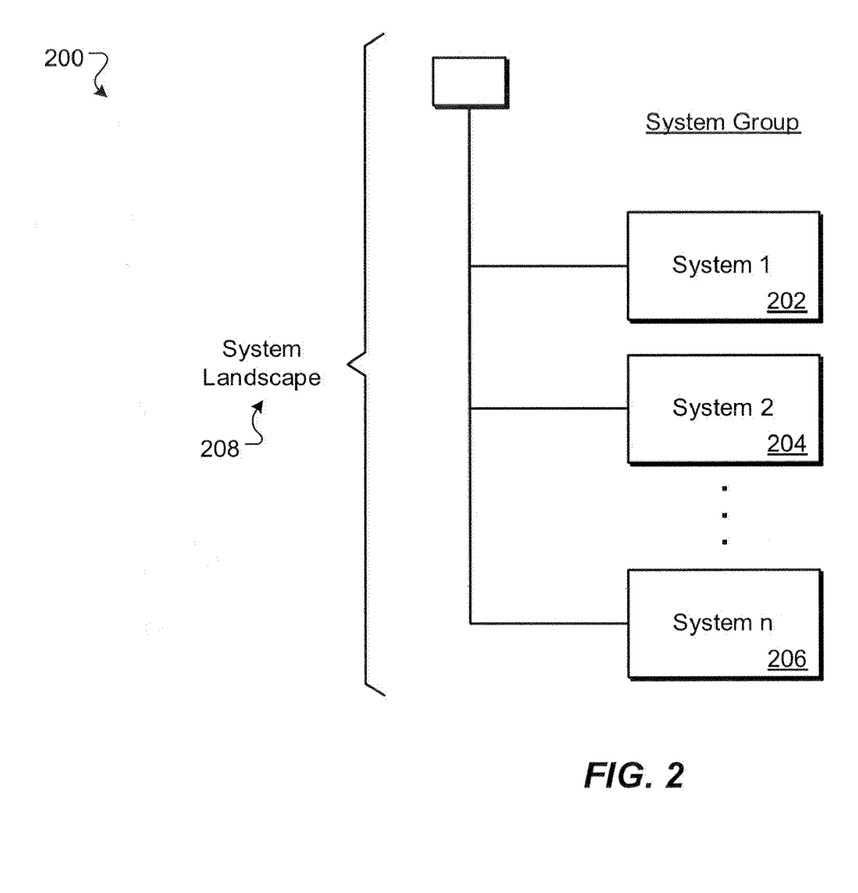
FIG. 2 is a block diagram of a generic system group in accordance with implementations of the present disclosure.

Referring now to FIG. 2, a block diagram depicts a generic system group 200, in accordance with implementations of the present disclosure. The exemplar system group 200 can include any number of systems. Each system represents processes executed in an application. The system group 200 includes a first system 202, a second system 204, and a third system 206.

Each system group may include a logical grouping of a set of systems that require similar processes. For example, a user may define a set of systems 202-206 that are primarily used for testing purposes. The systems 202-206 can be grouped to form a test environment within system group 200. Similarly, the user may define a set of computer systems that are specifically used for development environments, production environments, manufacturing environments, or other environment.

Each system group may include group type relations and group relations. The group type relations pertain to correlations (e.g., links) made between groups in different landscapes. For example, if two system groups share the same role (e.g., programmer), the two system groups may belong to the same group type. In general, groups belong in the same group type (or landscape) if, for example, the system groups exchange messages, appropriate system variables are shared, or the variable types are equivalent, but not harmonized in each corresponding system. The group relations pertain to links made between systems within one system group.

In some implementations, the layout of systems within an environment may be represented by a system landscape 208. The system landscape 208 provides a hierarchical tree structure of systems within a particular system group. In particular, the system landscape 208 represents a technical representation of one or more groups in a correlation model that can be provided as, but is not limited to, a Common Information Model (CIM). The system landscape is typically the highest node within a system hierarchy. In addition to system landscape assignments, system groups may also include roles that correlate to other roles in other system groups. Users may define a system landscape 208 and set system roles (not shown) within each system group 200.

Figure 3:
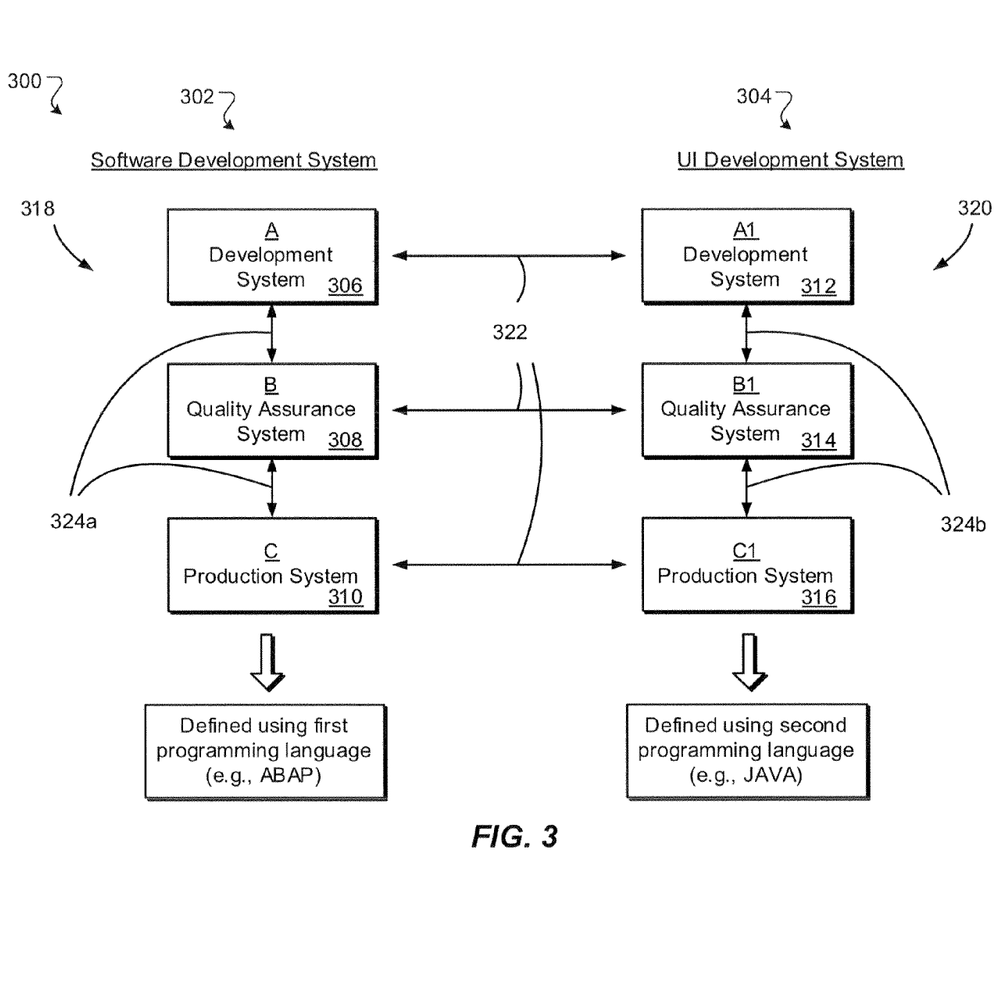
FIG. 3 is a block diagram of exemplar system groups that can be correlated in accordance with implementations of the present disclosure.
Figure 4:
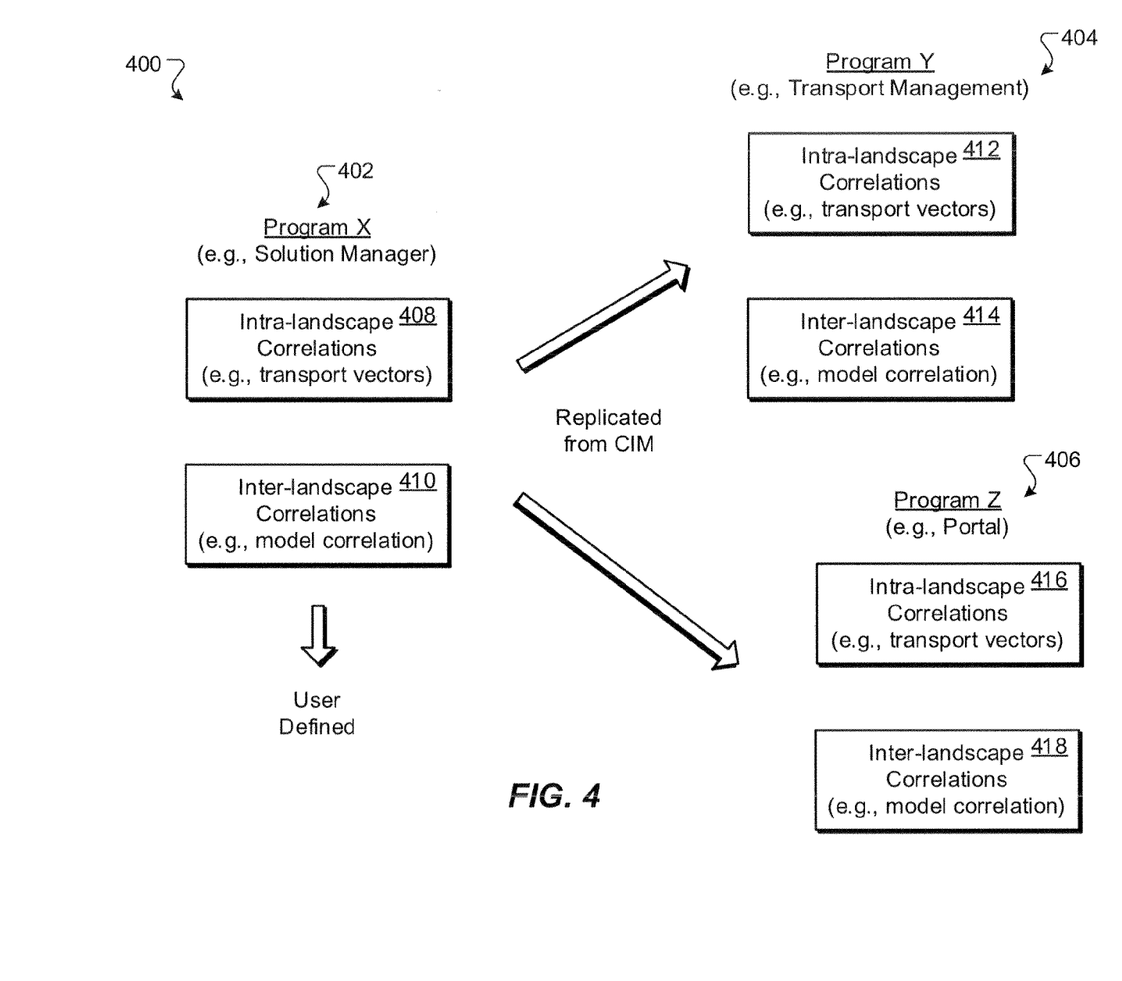
FIG. 4 is a block diagram of system correlation replication in accordance with implementations of the present disclosure.

Referring now to FIG. 3, a block depicts exemplar systems 300 that can be correlated. Each system 300 may include any number of system groups. Many business cases utilize multiple system groups to carry out tasks. For example, a software development system group generally includes a development system group, a quality assurance system group, and a production system. These system groups can be correlated to each other through tasks, system roles, bills of material, group type, etc.

In the exemplar illustration of FIG. 3, and by way of non-limiting example, the systems 300 include a software development system group 302 and a user interface (UI) development system group 304. The software development system group 302 represents the software development group and corresponding roles within an organization. The UI development system group 304 represents the interface development system and corresponding roles within an organization.

The software development system group 302 includes a development system (A) 306, a quality assurance system (B) 308, and a production system (C) 310. Each system 306-310 can, for example, be defined using a programming language including, but not limited to ABAP. The UI development system group 304 includes a development system (A1) 312, a quality assurance system (B1) 314, and a production system (C1) 316. Each system 312-316 can, for example, be defined using a programming language such as JAVA. The development systems (A) 306 and (A1) 312 pertain to application development and development processes. The quality assurance systems (B) 308 and (B1) 314 pertain to testing systems and processes. The production systems (C) 310 and (C1) 316 pertain to production systems and processes.

In one example, the system (A) 306 performs development for a specific department (e.g., financial services), while the system (A1) 312 performs development for the UI of the same department. Similarly, system (B) 308 can provide quality assurance for software developed for a department, while system (B1) 314 provides quality assurance for the UI developed for the same department. Continuing with the above example, the system (C) 310 can provide production support for development performed for the financial services department, while the system (C1) 316 provides production support for the UI development performed for the same department. Thus, the user can configure one or more landscapes that correspond to similar roles in other landscapes.

Each system group 302, 304 may be associated with a landscape hierarchy. For example, the software development system group 302 is associated with a first landscape 318 and the UI development system group 304 is associated with a second landscape 320. In general, the system landscapes 318, 320 include all system groups that may be installed for corresponding systems. Landscapes may be defined and configured by a user. For example, a user can define landscapes by setting system roles and assigning systems within system groups. For example, the user may assign system (A) 306, system (B) 308, and system (C) 310 to the software development system group 302, as shown in FIG. 3. Similarly, the user may assign system (A1) 312, system (B1) 314, and system (C1) 316 to the UI development system group 304, as shown in FIG. 3.

In some implementations, each landscapes 318, 320 can be correlated to another landscape or portion of a landscape. For example, a user can correlate system groups to other system groups within the landscape 318 using inter-landscape correlations 322. In particular, the user can correlate software development system components (A) 306, (B) 308, and (C) 310 to any or all of UI development system components (A1) 312, (B1) 314, and (C1) 316 using inter-landscape correlations 322.

A user can also correlate systems within a group to other internal systems using intra-landscape correlations 324a-b. For example, a user can correlate any or all of systems in landscape 318 (e.g., (A) 306, (B) 308, or (C) 310) to one another using intra-landscape correlations 324a. In addition, the user can correlate any or all of systems in landscape 320 (e.g., (A1) 312, (B1) 314, or (C1) 316) to one another using intra-landscape correlations 324b.

In some implementations, system roles (not shown) can be correlated to other system roles. For example, system roles from system group 302 may be correlated amongst systems within the system group 302. In addition, system roles from system group 304 may be correlated to system roles in system group 302, or another system group, for example.

In general, the correlations may provide a link to entities within landscapes and systems. The link may indicate similarity between entities. Alternatively, the link may indicate containment where one entity is contained or subsumed by another entity. The correlations provide a means to group technical systems (e.g., landscapes) to system groups and/or roles.

The correlations may provide a template that the user can invoke to create new or similar system groups. For example, if a user wishes to develop an exact replica of a particular system for a new system, the user can select the old system as a template for creating the new system. Similarly, if the user wishes to employ a portion of an old system, the system can select the old system and perform edits to the older group to fulfill the user's needs in the new system.

After determining inter-landscape correlations 322 and intra-landscape correlations 324a-b, a number of transport vectors may be generated. Transport vectors generally represent a landscape correlation. In some implementations, transport vectors can be used to define group types. In FIG. 3, a user has defined two group types, namely, the software development system group 302 and the UI development system group 304. Each landscape can be linked using transport vectors to other landscapes. For example, a transport vector correlates system (A) 306 to system (A1) 312. Another transport vector correlates system (B) 308 to system (B1) 314. Similarly, yet another transport vector correlates system (C) 310 to system (C1) 316.

Each system within the group can also be linked using a transport vector. For example, group 302 includes transport vectors from system (A) 306 to system (B) 308 and from system (B) 308 to system (C) 310. The transport vector may be bidirectional in nature, and as such, correlations may be detailed and stored in all affected systems. In some implementations, correlation data may also be stored external to the system groups and landscapes. In some implementations, systems may not be correlated with any other systems within the group or between landscapes.

Referring again to FIG. 3, a user can use data in the UI development system group 304 as a template to define the software development system group 302. The template may be useful since both groups include similar system functions, system roles, and data functions. As such, the user is not required to regenerate overlapping data when defining the UI development system group 304. In some implementations, a number of groups can be used as templates to create one new group. In some implementations, two or more seemingly unrelated groups can be used in partial form to generate a new system group. The new system group may be of the same type as the template groups, or alternatively, may be of a different group type. For example, a user can create a new system group from a number of other system groups based on relationships between the group types, rather than the actual group type or content.

Referring now to FIG. 4, a block diagram depicts a system correlation replication 400 in accordance with implementations of the present disclosure. The replication 400 in this example involves three programs including a program (X) 402, a program (Y) 404, and a program (Z) 406. In one example, the program (X) 402 may be a solution manager program, the program (Y) 404 may be a transport management program, and the program (Z) 406 may be a portal program. The solution manager program (X) 402 may represent a system tool, content and gateway to create, operate, manage and monitor management solutions over time. The transport management program (Y) 404 may represent a set of tools used for organizing, performing, and monitoring transports between systems and system groups. The portal program 406 may represent a resource that provides internal and/or external access to system information, applications, and services.

Similar to the example described in FIG. 2, a user can define correlations in one system group and use those correlations to define and configure other system groups. For example, one or more groups can be used as a template to define another group of a differing group type. The template may be form data, structure data, or other system data that can be replicated from a CIM and included in another system group or landscape. In the depicted example 400, correlations and data associated with program (X) 402 can be used as a template for generating data in both programs (Y) 404 and (Z) 406.

More specifically, FIG. 4 depicts a group (e.g., landscape) that has been previously configured by the user in the program (X) 402 using both intra-landscape correlations 408 and inter-landscape correlations 410. In particular, the intra-landscape correlations 408 can be defined via transport vectors and the inter-landscape correlations 410 can be defined using model correlations.

At some point, the user may choose to define a new system group. For example, the user may open (e.g., instantiate) application program (Y) 404. Upon opening program (Y) 404, the user may provide a group type as input. The user is then presented with a list of available, pre-defined groups, including the group originally defined in program (X) 402. System information already provided in program (X) 402 can be carried over as a suggestion for the new group. In the example of FIG. 4, the user selects the group from program (X) 402, and the correlations are automatically carried over into program (Y) 404. In a specific example, the user can select a group within program (X) 402 to use as a template, and the correlations for program (X) 402 are carried over with corresponding roles as a transport group. The correlations are generally provided in a model (e.g., CIM) that is accessed by the system. Particularly, the correlations are replicated from the model. In some examples, the correlations carried over from program (X) 402 to program (Y) 404 may include intra-landscape correlations 412 and/or inter-landscape correlations 414.

Program (Z) 406 may be defined in a similar manner as program (Y) 404 using some, none, or all of the data content represented in program (X) 402. In some implementations, the program (Z) 406 may be defined for execution with the program (Y) 404 instantiation. The correlations carried over from program (X) 402 to program (Y) 404 may include intra-landscape correlations 416 and/or inter-landscape correlations 418. In some implementations, the program (Z) 406 may represent a portal system that is privy to details regarding transport management and solution management. The program (Z) 406 can use the knowledge of other system details to automatically generate a system. In this manner, a portion of system information is provided as a correlation model and integrated into program (Z) 406.

If the user desires to edit a previously generated system group, the user can begin by instantiating an application program and selecting a system group type. If the new system group is associated with a different system group type than the previously generated system group, then available system groups are populated for user selection. If the user selects one system, the new group will be associated to the group type of the selected system.

In some implementations, a user may wish to use only a portion of a system group as a template. In this example, the user may select desired data items within the "template" system group and edit around the landscape accordingly.

Figure 5:
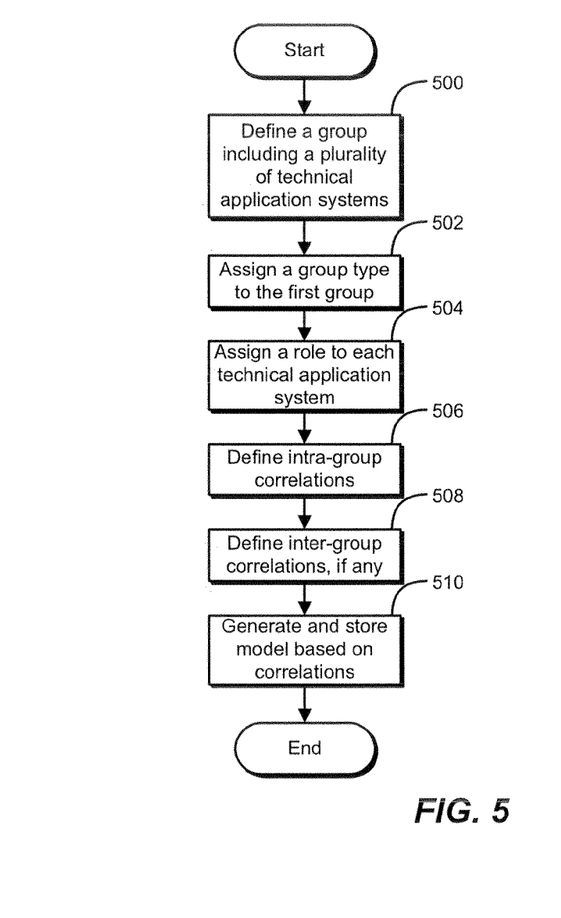
FIG. 5 is a flowchart illustrating exemplar steps that can be executed to generate a new group in accordance with implementations of the present disclosure.

FIG. 5 is a flowchart illustrating exemplar steps that can be executed to generate a new group in accordance with implementations of the present disclosure. In particular, the steps can be executed to generate a correlation model between a number of groups of application systems. The process shown in FIG. 5 may be implemented using software instructions stored in a computer-readable storage medium and executed by a processing system including one or more processing apparatus. The process can, for example, be performed in the architecture 100, the clients 102 or 104, and/or servers 106 or 108.

In step 500, the process defines one or more groups including a number of technical application systems. For example, the architecture 100 instantiates the computer program to define the software development system 302 and a UI development system group 304. Each system group 302, 304 includes a number of application systems. For example, system 302 includes system (A) 306, system (B) 308, and system (C) 310. Similarly, system group 304 includes system (A1) 312, system (B1) 314, and system (C1) 316.

In step 502, the process assigns a group type to the groups. For example, a user can assign a group type to groups 302, 304 based on group characteristics. In step 504, the process assigns a role to each technical application system in a system group. For example, the architecture 100 defines a first set of roles that correspond to the application systems 306, 308, 310 in the system group 302. Particular roles may include computer programmer, tester, manufacturing engineer, etc. Similarly, the architecture 100 can define a second set of roles, which correspond to the application systems 312, 314, 316 in the system group 304. The correlation model from above may include correlations between the first set of roles and the second set of roles.

In step 506, the process defines intra-group correlations. For example, the architecture 100 defines intra-group correlations 324a-b between (A)-(C) and (A1)-(C1), accordingly. In step 508, the process defines inter-group correlations. For example, the architecture 100 defines inter-landscape correlations 322 between landscape 318 and landscape 320.

In step 510, the process generates and stores a model based on correlations. For example, the architecture 100 stores correlation models in a repository 112 or 114 for future use.

Figure 6:
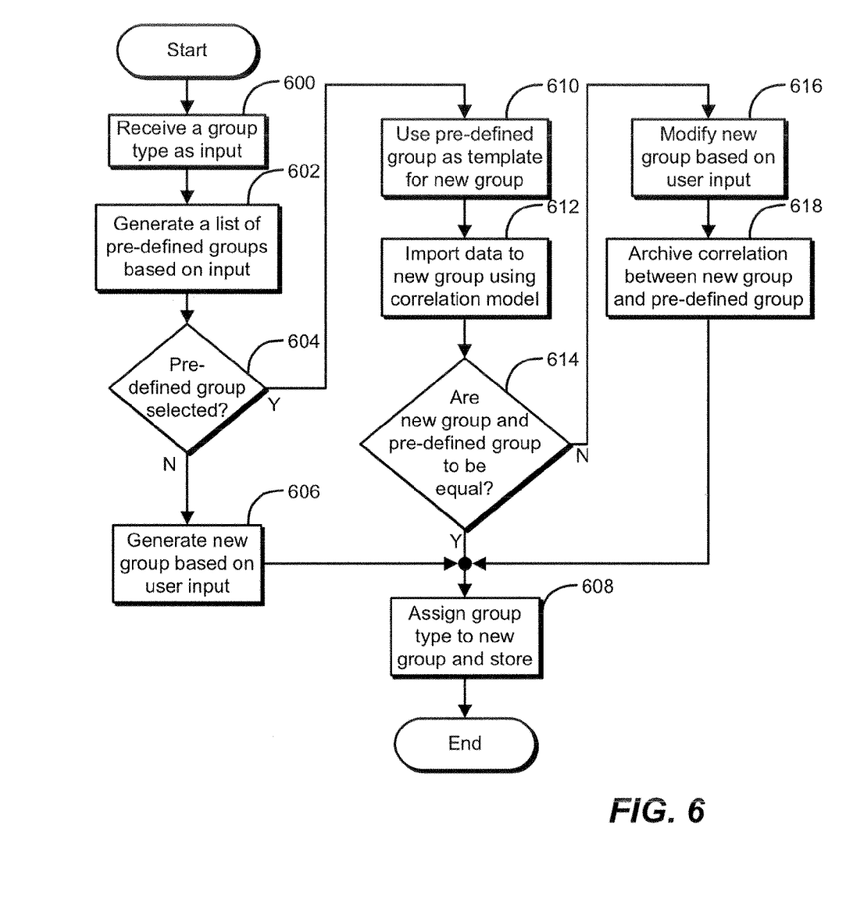
FIG. 6 is a flowchart illustrating exemplar steps that can be executed to generate a new group based on a correlation model in accordance with implementations of the present disclosure.

FIG. 6 is a flowchart illustrating exemplar steps that can be executed to generate a new group based on a correlation model in accordance with implementations of the present disclosure. The process shown in FIG. 6 may be implemented using software instructions stored in a computer-readable storage medium and executed by a processing system including one or more processing apparatus. The process can, for example, be performed in the architecture 100, the clients 102 or 104, and/or servers 106 or 108.

In step 600, the process receives a group type as input. For example, the architecture 100 may receive a user input identifying a group type. The architecture 100 can use the received input to correlate a first and a second group.

In step 602, the process generates a list of pre-defined groups based on the input. For example, the architecture 100 generates a list of available groups based on the group type and at least one of the first group 302 and the second group 304. The user in this example may be selecting a template (e.g., correlation model) to create a third group. That is, the third group may be provided based on a user selection from the system provided list.

In step 604, the process determines whether a pre-defined group is selected. If a pre-defined group is not selected, the process generates a new group based on the user input, in step 606. The process then assigns a group type to the new group and stores the new group, in step 608. If a pre-defined group is selected, the process uses the selected pre-defined group as a template for the new group, in step 610.

In step 612, the process imports data to the new group using a correlation model. For example, the architecture 100 imports intra-group correlations, inter-group correlations, role data, and other system data into the new group. The imported data is based on the existing correlation model for the selected pre-defined group.

In step 614, the process determines whether the user intends to generate the new group equivalent to the selected pre-defined group. For example, the architecture 100 determines whether the new system will be identical to or modified from the selected pre-defined group. If the user intends the two groups to be equal, the process assigns the pre-defined group type to the new group and stores the new group, in step 608. If the user does not intend the two groups to be equal, the process modifies the new group based on user inputted data, in step 616. For example, the architecture 100 can edit portions of the selected first group template and carry over the edits of the first group into the new group.

In step 618, the process archives the correlation between the new group and the pre-defined group. For example, the architecture 100 archives new correlation models based on the correlations between the new group and the pre-defined group. The process then assigns the group type to the new group and stores the new group in a repository, in step 608.

Figure 7:
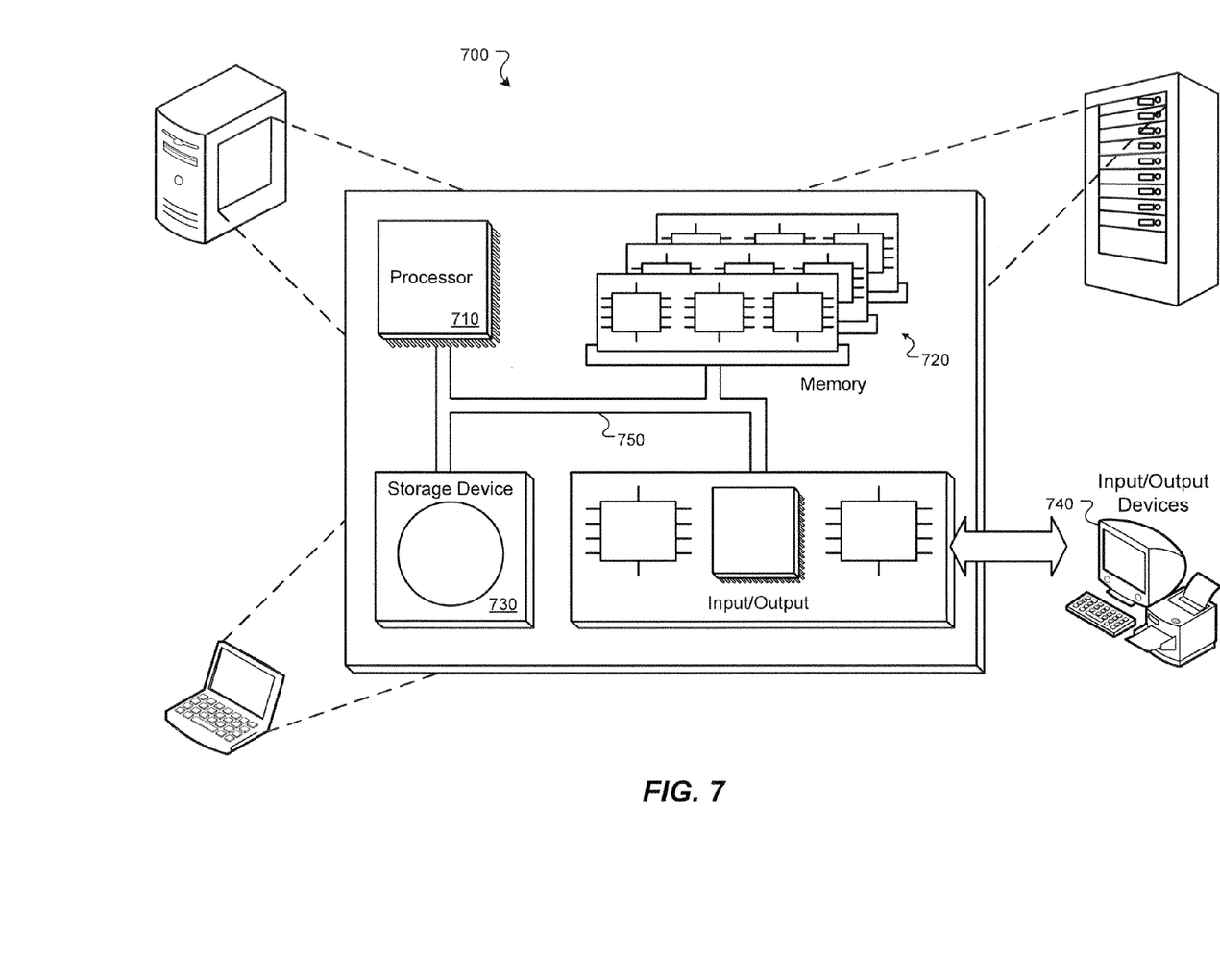
FIG. 7 is a schematic illustration of exemplar computer systems that can be used to execute implementations of the present disclosure.

Referring now to FIG. 7, a schematic diagram of an exemplar computer system 700 is provided. The system 700 can be used for the operations described in association with the method described in FIGS. 5 and 6 according to one implementation. For example, the system 700 may be included in any or all of the client 102, the client 104, the server 106, the server 108, or systems 302 or 304 described in FIG. 3. The system 700 includes a processor 710, a memory 720, a storage device 730, and an input/output device 740. Each of the components 710, 720, 730, and 740 are interconnected using a system bus 780. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
   instantiating a first computer program that is executable using one or more processors;
   using the first computer program, defining a first group comprising a plurality of application systems and a second group comprising a plurality of application systems;
   defining a first set of roles, each role of the first set corresponding to an application system of the first group;
   defining a second set of roles, each role of the second set corresponding to an application system of the second group;
   receiving user input;
   in response to the user input, correlating the plurality of application systems within the first group to generate a correlation model comprising one or more inter-landscape correlations and one or more intra-landscape correlations and correlations between the first set of roles and the second set of roles;
   storing the correlation model in a computer-readable storage medium; and
   providing a target group comprising a plurality of application systems based on the correlation model.

2. The method of claim 1, further comprising storing correlations between the first group and the second group in the correlation model, wherein providing the target group is further based on the correlations between the first group and the second group.

3. The method of claim 1, further comprising:
   receiving an input corresponding to a group type; and
   generating a list of available groups based the group type and at least one of the first group and the second group, wherein the target group is provided based on a user selection from the list.

4. The method of claim 1, further comprising:
   editing the first group; and
   carrying over edits of the first group to the target group.

5. The method of claim 1, further comprising instantiating a second computer program that is executable using one or more processors, wherein the target group is provided for execution with the second computer program.

6. The method of claim 1, wherein providing the target group comprises integrating at least a portion of system information provided in the correlation model to the target group.

7. The method of claim 1, wherein the first group and the second group correspond to a group type, and one of the first group and second group is used as a template to define the target group, the target group corresponding to a different group type.

8. A non-transitory storage medium coupled to one or more processors and having instructions stored thereon which, when executed by the one or more processors, cause the one or more processors to perform operations comprising:
   instantiating a first computer program that is executable using one or more processors;
   using the first computer program, defining a first group comprising a plurality of application systems and a second group comprising a plurality of application systems;
   defining a first set of roles, each role of the first set corresponding to an application system of the first group;
   defining a second set of roles, each role of the second set corresponding to an application system of the second group;
   receiving user input;
   in response to the user input, correlating the plurality of application systems within the first group to generate a correlation model comprising one or more inter-landscape correlations and one or more intra-landscape correlations and correlations between the first set of roles and the second set of roles;
   storing the correlation model in a computer-readable storage medium; and
   providing a target group comprising a plurality of application systems based on the correlation model.

9. The computer-readable storage medium of claim 8, wherein the operations further comprise storing correlations between the first group and the second group in the correlation model, wherein providing the target group is further based on the correlations between the first group and the second group.

10. The computer-readable storage medium of claim 8, wherein the operations further comprise:
    receiving an input corresponding to a group type; and
    generating a list of available groups based the group type and at least one of the first group and the second group, wherein the target group is provided based on a user selection from the list.

11. The computer-readable storage medium of claim 8, wherein the operations further comprise:
    editing the first group; and
    carrying over edits of the first group to the target group.

12. The computer-readable storage medium of claim 8, wherein the operations further comprise instantiating a second computer program that is executable using one or more processors, wherein the target group is provided for execution with the second computer program.

13. The computer-readable storage medium of claim 8, wherein providing the target group comprises integrating at least a portion of system information provided in the correlation model to the target group.

14. The computer-readable storage medium of claim 8, wherein the first group and the second group correspond to a group type, and one of the first group and second group is used as a template to define the target group, the target group corresponding to a different group type.

15. A system, comprising:
one or more processors; and
a computer-readable storage medium coupled to the one or more processors and having instructions stored thereon which, when executed by the one or more processors, cause the one or more processors to perform operations comprising:
instantiating a first computer program that is executable using one or more processors;
defining a first set of roles, each role of the first set corresponding to an application system of the first group;
defining a second set of roles, each role of the second set corresponding to an application system of the second group;
receiving user input;
in response to the user input, correlating the plurality of application systems within the first group to generate a correlation model comprising one or more inter-landscape correlations and one or more intra-landscape correlations and correlations between the first set of roles and the second set of roles;
storing the correlation model in a computer-readable storage medium; and
providing a target group comprising a plurality of application systems based on the correlation model.

16. The system of claim 15, wherein the operations further comprise storing correlations between the first group and the second group in the correlation model, wherein providing the target group is further based on the correlations between the first group and the second group.

17. The system of claim 15, wherein the operations further comprise:
receiving an input corresponding to a group type; and
generating a list of available groups based the group type and at least one of the first group and the second group, wherein the target group is provided based on a user selection from the list.

18. The system of claim 15, wherein the operations further comprise:
editing the first group; and
carrying over edits of the first group to the target group.

19. The system of claim 15, wherein the operations further comprise instantiating a second computer program that is executable using one or more processors, wherein the target group is provided for execution with the second computer program.

20. The system of claim 15, wherein providing the target group comprises integrating at least a portion of system information provided in the correlation model to the target group.

21. The system of claim 15, wherein the first group and the second group correspond to a group type, and one of the first group and second group is used as a template to define the target group, the target group corresponding to a different group type.

* * * * *